April 14, 1964 E. W. MANTEUFFEL 3,129,381

MAGNETIC AMPLIFIER WITH SHUNT-LOAD AND AMPLITUDE CONTROLLED OUTPUT VOLTAGE

Filed Feb. 4, 1960 3 Sheets-Sheet 1

Inventor:
Erich W. Manteuffel,
by Allen E. Amgott
His Attorney.

April 14, 1964 E. W. MANTEUFFEL 3,129,381

MAGNETIC AMPLIFIER WITH SHUNT-LOAD AND AMPLITUDE CONTROLLED OUTPUT VOLTAGE

Filed Feb. 4, 1960 3 Sheets-Sheet 2

Inventor:
Erich W. Manteuffel,
by Patrick D. Ward
His Agent.

Inventor:
Erich W. Manteuffel,
by Allen E. Angott
His Attorney.

United States Patent Office 3,129,381

Patented Apr. 14, 1964

3,129,381

MAGNETIC AMPLIFIER WITH SHUNT-LOAD AND AMPLITUDE CONTROLLED OUTPUT VOLTAGE

Erich W. Manteuffel, Ithaca, N.Y., assignor to General Electric Company, a corporation of New York Filed Feb. 4, 1960, Ser. No. 6,733
12 Claims. (Cl. 323—89)

This invention relates to magnetic amplifier technology, and more particularly to a new type of lightweight magnetic amplifier in which small saturable reactors and controlled silicon rectifiers are employed in parallel with a capacitor as switching elements.

Magnetic amplifiers have become increasingly popular in the last few years, and much development work has been undertaken in attempting to relate their performance to various operating conditions. In the development of the art, however, there has been an obvious tendency to restrict the research and development work essentially to certain rather well-known basic circuits and configurations. These basic configurations have been carefully studied and documented in the technical literature. As a result, little hope of greatly improving the operating characteristic or performance of these known magnetic amplifier circuits by modification or re-design seems to present itself at the present time. This means that a fundamentally new line of attack, or the use of some entirely different natural phenomena must be looked to, as a preliminary to advancing the state of the art by any substantial degree.

The present invention, accordingly, contemplates a new type of magnetic amplifier with many properties entirely dissimilar to those of conventional magnetic amplifiers.

For instance, it is well known that conventional magnetic amplifiers often function as simple non-linear controllable impedances in order to gate current flow "On" and "Off." The amplifiers provided by this invention, on the other hand, act as variable amplitude voltage sources. Unlike conventional magnetic amplifiers, the presently disclosed amplifiers are excellently suited for applications which require precision voltage regulation.

Output voltage control in known magnetic amplifiers, moreover, is achieved by varying the firing angle with respect to the waveform, in the same manner used to control Thyratron tubes. In contrast to this kind of control, the average level of the output voltage provided by the present amplifier is changed predominantly by variations in its amplitude.

In the several embodiments of the invention, improved magnetic amplifiers with shunt load and amplitude controlled output potentials are provided. These shunt loaded magnetic amplifiers exploit ferroresonance phenomena and utilize the properties of controlled silicon rectifiers which are used with small saturable reactors. By using these units, the flux swing within the cores of the saturable reactors is regulated in a manner which permits the use of a magnetic amplifier as a variable voltage source.

The present invention exploits and improves upon the recently discovered technique of coupling a load circuit across a non-linear oscillatory circuit comprised of a capacitor connected in parallel with a saturable inductor. A few aspects of this concept have been analyzed and treated in the technical literature. For instance, in an article entitled "Oscillating Circuits Incorporating a Choke With Rectangular Magnetization Curve," published by Buchhold and Stuhlinger in Technical Report No. 70, Redstone Arsenal, January 15, 1952, it is demonstrated that where the hysteresis loop of the core for the saturable inductor used in such a circuit is appropriately rectangular, it is possible to generate an output voltage having a half-cycle average value which remains inherently constant with relatively large fluctuations in the value of input voltage. One method of controlling the flux swing within the core of the reactor used in such a non-linear oscillatory circuit is broadly disclosed in an article entitled "The D.C. Controlled A.C. Voltage Source, a New Magnetic Amplifier," written by Manteuffel and McCary, and appearing in the November 1957 issue of the periodical "Communications and Electronics," which is published by the American Institute of Electrical Engineers.

The present invention advances the state of the art, and effects far reaching improvements over the circuits disclosed in these prior art publications. Other improvements over the circuit arrangements and systems disclosed in these prior art articles form the subject matter of a co-pending application filed by the assignee of the present invention entitled Magnetic Voltage Stabilizer Employing Controlled Silicon Rectifiers, Serial No. 6,686, filed February 4, 1960.

The present invention differs from the subject matter of the co-pending case in providing method and means for controlling the total flux swing within the core of the saturable reactor used in the magnetic amplifier circuit. Before discussing the benefits and advantages which stem from this type of flux control, it is necessary to develop the basic theory upon which this mode of control is based.

In present day D.-C. controlled A.-C. voltage sources, as earlier mentioned, it is known to connect a capacitor in parallel with a saturable reactor in order to produce a non-linear oscillatory circuit. This circuit ordinarily draws current from a source through a linear inductance, and the load circuit is connected in parallel with the ferroresonant circuit formed by the capacitor and saturable reactor. In the reference "Oscillating Circuit Incorporating a Choke With Rectangular Magnetization Curve," by Buchhold and Stuhlinger, referred to immediately above, it is shown that where the hysteresis loop of the core material is quite rectangular, the average half-wave output voltage is inherently constant over a wide range of input voltage variation provided the supply frequency is constant. According to the present invention, the flux level in the core is controlled in order to permit a measure of regulation over the value of the output voltage. The underlying reason for controlling the flux swing within the core of the saturable reactor is appreciated by referring to the basic equation for the output voltage of such an amplifier. This voltage is given by:

$$E_0 = 2fN \cdot \Delta B \cdot A \cdot 10^{-8}$$

where $f$=frequency, c.p.s.
$N$=number of reactor turns
$A$=effective core cross-section, square centimeters
$\Delta B$=swing in flux density, gauss The significance of this equation is attributable to the presence of the variable $\Delta B$. If the total flux swing in the core can be controlled, the value of $\Delta B$ becomes the factor which predominantly regulates the magnitude of the output voltage produced by the circuit. If a proper value of control current is circulated in the control windings of the saturable reactor in order to reset the flux during non-conducting half-cycles, the value of the swing in flux density may be readily regulated. When the control current is large enough to reset the core to negative saturation, the output voltage will reach its maximum value. Of course, intermediate values of flux level within the core may be provided by regulating the value current in the control winding for the reactor.

In contrast to conventional magnetic amplifiers, resetting of the flux within the core of the reactors used in the amplifier is practically uninfluenced by the value of impedance in the control circuit, and flux resetting is able to take place during full half-cycles.

According to the invention, small saturable reactors are used in a circuit which controls the amount of flux swing in order to regulate the output voltage supplied to the load circuit. These small saturable reactors are used in conjunction with controlled rectifiers connected in parallel with a capacitor as switching elements, in an arrangement which permits simple regulation of the amplitude of the output voltage.

In military and commercial application it is often desirable to achieve voltage regulation by amplitude control with minimum losses, and the fewest stages of filtering, since weight reduction is of paramount importance. The invention is of great utility in this application, because of its lightweight and excellent output waveform.

Accordingly, therefore, a primary object of the invention is to provide a lightweight magnetic amplifier which is capable of producing an output voltage variable in amplitude.

Another object of this invention is to disclose circuitry and components for an improved type of magnetic amplifier in which controlled silicon rectifiers are used in conjunction with saturable reactors to provide an amplitude-controlled output voltage.

Another object of the invention is to produce a magnetic amplifier circuit using ferroresonance phenomena in which saturable reactors and controlled silicon rectifiers are used to control the firing sequence of the circuit.

Another object of the present invention is to disclose a magnetic amplifier circuit in which controlled silicon rectifiers are gated by means of saturable reactors at the end of each half-cycle.

Still another object of this invention is to disclose circuitry and components for a magnetic amplifier in which the total flux swing within the core of a saturable element is controlled to provide a variable voltage source.

A further object of the invention is to disclose a novel combination of silicon rectifiers acting in conjunction with saturable reactors in which the level of the flux swing is controlled by means of a control winding supplied with a unidirectional signal.

These and other objects and advantages of the present invention will become apparent by referring to the accompanying detailed description and drawings, in which like numerals indicate like parts, and in which.

Figure 2:
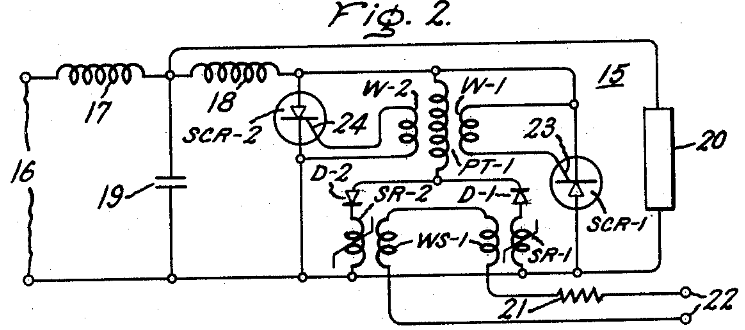
FIGURE 2 illustrates a shunt loaded magnetic amplifier in which a pair of saturable reactors are used with a pair of diodes in a doubler circuit in order to control the flux swing and the value of output voltage produced by the magnetic amplifier.
Figure 3:
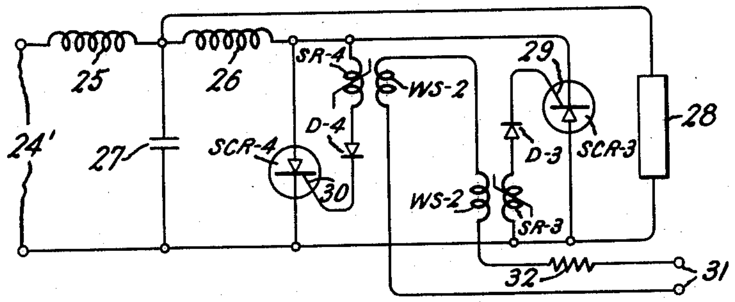
Figure 4:
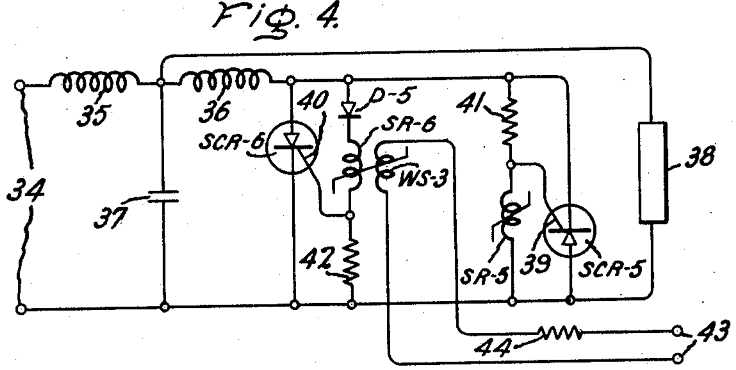
Figure 2A:
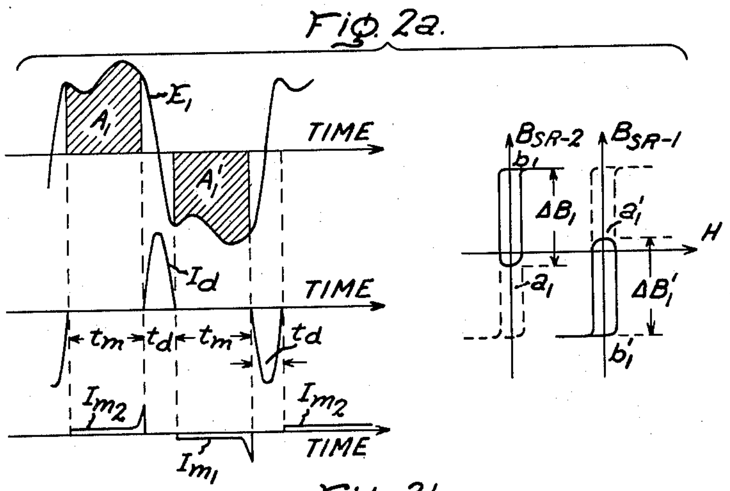
Figure 2B:
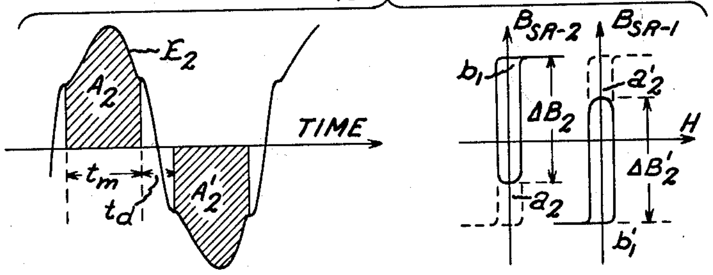
Figure 2C:
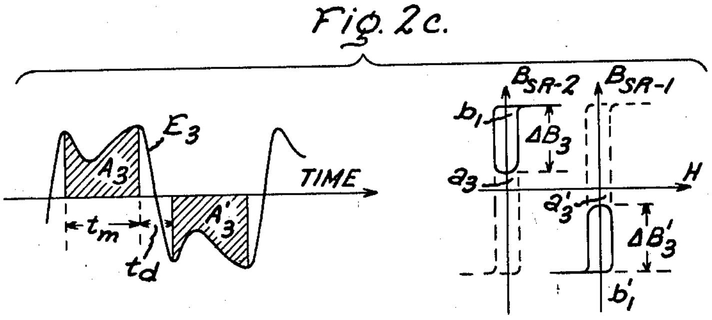
Figure 2D:
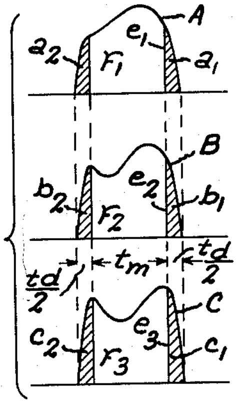
Figure 5:
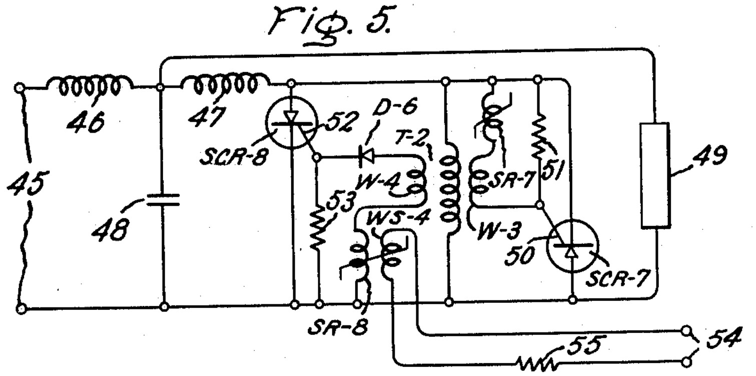
Figure 6:
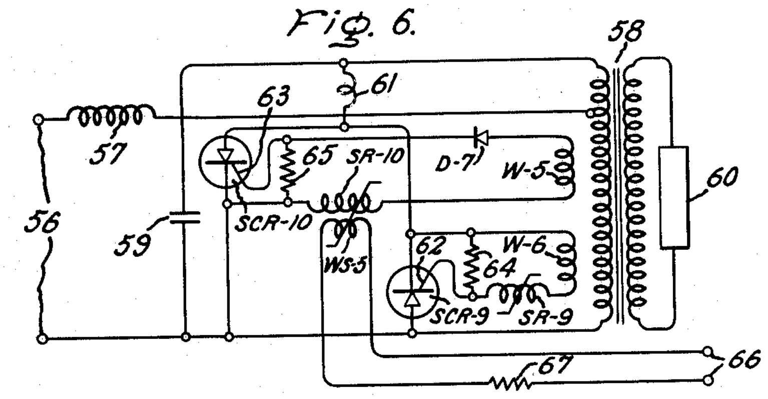
Figure 7:
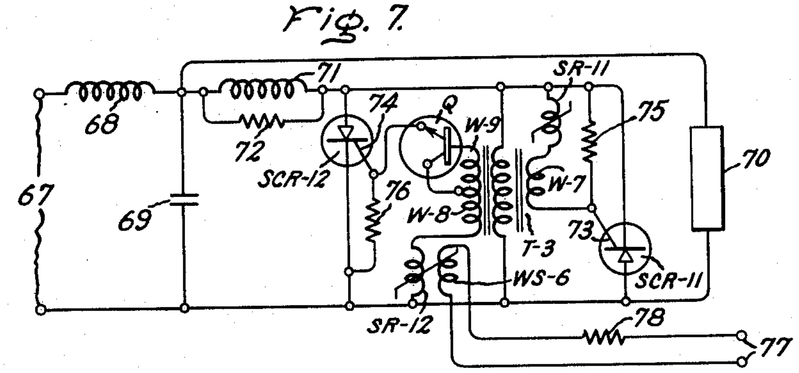

FIGURES 2*a*, 2*b*, 2*c* show representative output voltages versus time for the amplifier circuit of FIGURE 2 for three different values of control voltage applied at the terminals 22; also shown are B-H loops for alternating half cycles of the saturable reactors;

FIGURE 2*d* shows output voltages as a function of voltages applied at the terminals 16 of the amplifier of FIGURE 2;

FIGURE 3 shows a modification of the circuit shown in FIGURE 2 in which the need for a pulse transformer is eliminated;

FIGURE 4 shows a modification of the circuit shown in FIGURE 2 which employs a symmetrical slaving circuit in which only one saturable reactor is controlled from an external signal;

FIGURE 5 shows an improved magnetic amplifier type of controlling device provided with means for suppressing unidirectional voltage components in the output signal;

FIGURE 6 illustrates a modification of FIGURE 5 which is suitable for use in deriving an output potential with an amplitude greater than that of the available input supply voltage; and FIGURE 7 shows the use of a synchronous rectifier for blocking current flow in one of the controlled silicon rectifiers in the magnetic amplifier circuit during the half-cycle required for flux resetting.

Figure 1:
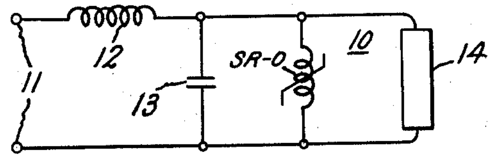
FIGURE 1 is a schematic diagram of a prior art type of magnetic voltage stabilizer which is used in explaining the invention.

Turning now to the detailed description of the invention, and referring more particularly to FIGURE 1, the reference numeral 10 has been used in this figure to designate generally a conventional magnetic stabilizer circuit. The circuit 10 includes a pair of input terminals 11, the upper terminal of which is coupled to one end of a linear inductance 12. The opposite end of the linear inductance 12 is connected to one plate of a capacitor 13, and the opposite plate of this capacitor is tied back to the lower input terminal. A saturable reactor SR–0 is connected in parallel across the plates of the capacitor 13, and a load circuit 14 is connected in shunt with the ferroresonant circuit formed by the capacitance 13 and saturable reactor SR–0. The characteristics and performance of the magnetic stabilizer circuit shown in FIGURE 1 have been treated in the technical literature. For instance, in an article entitled "Oscillating Circuit Incorporating a Choke With Rectangular Magnetization Curve," published by Buchhold and Stuhlinger, in Technical Report No. 70, Redstone Arsenal, Huntsville, Alabama, on January 15, 1952, it is demonstrated that where the hysteresis loop of the core material for reactor SR–0 is quite rectangular, the average half-wave output voltage developed by the stabilizer is inherently constant over a wide range of input voltages, provided the supply frequency remains relatively constant.

Moreover, as earlier explained in the present specification, the output voltage is directly related to the value of swing in flux density $\Delta B$ in gauss. When the total flux swing in the core of the reactor SR–0 is controlled in the manner taught by the present invention, a variable voltage source is made available. The circuit, however, principally retains all of the inherent advantages of a magnetic stabilizer.

While conventional magnetic amplifiers act as nonlinear impedances or controlled current gates, the improvements provided in the present invention act as controllable voltage sources. Unlike conventional magnetic amplifiers where voltage control is achieved by controlling the firing angle, as is done with Thyratrons, the output voltage of the present magnetic amplifiers is changed predominantly by variation in amplitude. Moreover, in contrast to conventional magnetic amplifiers, the flux resetting within the presently disclosed amplifiers is practically uninfluenced by the value of the impedance utilized in the control circuit for the saturable reactor. As a result, resetting is able to take place during full half-cycle periods.

Continuing with the detailed description of the invention, reference to FIGURE 2 of the accompanying patent drawings will now be made. In this figure, the reference numeral 15 is used to indicate generally one embodiment of the shunt load amplitude-controlled magnetic amplifiers constructed according to the teachings of the present invention. The circuit 15 will be seen to include a pair of input terminals 16, the upper one of which is connected to one end of a first linear inductance 17. The other end of the linear inductance 17 is connected in series with one end of the second linear inductance 18. A capacitor 19 is connected in series between the juncture formed between inductors 17 and 18 and the lower input terminal 16. The load circuit 20 for the amplifier is connected across the plates of the capacitor 19.

In the approximate central portion of FIGURE 2, a pulse transformer PT–1 provided with a primary winding and a pair of secondary windings W–1 and W–2 is illustrated. The primary winding of the transformer PT–1 is connected in series with a first diode D–1 and a saturable reactor SR–1.

A second oppositely poled diode D–2 is connected in series with a saturable reactor SR–2, and the sub-circuit thus formed is connected in parallel with the diode D–1 and reactor SR–1 referred to immediately above.

The reactors SR–1 and SR–2 are regulated and controlled by means of a plural coil signal winding which is designated by the reference character WS–1. It will be appreciated by those skilled in the art that the magnitude of the flux level in the cores of the respective reactors in controlled by the value of current which is supplied to the signal winding. The control current thus utilized is drawn from a pair of input terminals 22 and is caused to traverse a control circuit resistor 21 which is connected in series with the coils of the signal winding WS–1.

To the right of the transformer PT–1, a first controlled silicon reactor SCR–1 is shown. A second controlled silicon reactor SCR–2 is connected on the opposite side of the pulse transformer. A control electrode 23 is associated with the controlled rectifier SCR–1 to initiate conduction therethrough, and the controlled rectifier SCR–2 is provided with a control electrode 24 for the same purpose.

The control electrode 23 is connected through the secondary winding W–1 of pulse transformer PT–1 to the cathode element of the silicon rectifier SCR–1. The control electrode 24 associated with silicon rectifier SCR–2 is connected in like manner through secondary winding W–2 to the cathode element of rectifier SCR–2.

The small saturable reactors SR–1 and SR–2 associated with diodes D–1 and D–2 in this circuit act to provide a variable level of flux swing, and consequently control the value of the output voltage applied across the load circuit 20. It will be apparent to those skilled in the art that the reactors and diodes are interconnected to form a doubler type circuit arrangement. The amount of flux swing is readily regulated by the magnitude of the control potential applied to the terminals 22 to cause current flow through the plural coil signal winding WS–1.

The small pulse transformer PT–1 associated with the doubler circuit serves to fire the controlled silicon rectifiers SCR–1 and SCR–2 during alternate half-cycles of the supply frequency. Because of the rapid low loss discharge of capacitor 19 through the linear inductance 18 at the end of each half-cycle, the shunt load amplifier shown in FIGURE 2 exhibits a square wave output voltage which is very much superior to that produced by known types of devices described in the prior art publications discussed earlier in the present patent specification.

In order to explain in somewhat more detail the operation of the shunt loaded magnetic amplifier, reference is now made to FIGURES 2*a*, 2*b*, and 2*c* of the accompanying drawings. These figures illustrate representative displays of the amplifier output voltage versus time for three different values of this voltage which correspond to three different settings of the control source voltage applied to terminals 22 of FIGURE 2. These voltage versus time curves have been constructed according to rules, provided in great detail for conventional magnetic stabilizers within the article referenced earlier of Buchhold and Stuhlinger. FIGURES 2*a*, 2*b*, and 2*c* also show B-H loops indicating the total change in flux absorbed during alternate half-cycles by the small saturable reactors SR–1 and SR–2 in correspondence with the three different assumed half-cycle average values of output voltage.

In FIGURE 2*a*, curve $E_1$ represents the output voltage wave shape for the condition of nominal operation as defined in the article cited earlier of Buchhold and Stuhlinger. This is the condition where the value of the output voltage at a given line voltage is such that the least deviation from a rectangular waveform occurs. This figure shows, also, the magnetizing currents $I_{m_1}$ and $I_{m_2}$ flowing through the gate windings of saturable reactors SR–1 and SR–2, at alternate half-cycles, and through the primary winding of pulse transformer PT–1. In addition, the discharge current $I_d$ of capacitor 19 at the end of each half-cycle is illustrated. These currents are shown in proper time relationship to curve $E_1$. Two time intervals can be distinguished, namely $t_m$, where the flux within the saturable reactors varies, and $t_d$, the intervals during which capacitor 19 discharges while its terminal voltage reverses its polarity. The latter interval is greatly exaggerated in value for purpose of better display. In reality it is extremely short in comparison with time $t_m$.

The first positive half-cycle of FIGURE 2*a* shall now be considered. The hatched area $A_1$ defines the amount of flux the saturable reactor SR–2 is capable of absorbing during time $t_m$ if it had been reset during the previous half-cycle to point $a_1$ on a minor B-H loop as indicated in the right portion of FIGURE 2*a*. The minor loops are shown as solid lines, while the unused portion of the major loops are shown as dashed lines. Reactor SR–2 experiences a flux density change $\Delta B_1$ until saturating at the end of the first interval $t_m$ where $\Delta B_1$ must be proportional to area $A_1$. It is assumed that the upper plate of capacitor 19 is positive.

During time $t_m$ a very small magnetizing current $I_{m_2}$ flows through the gate winding of SR–2 and the primary winding of pulse transformer PT–1, which experiences a very abrupt increase at the instant of saturation. This will cause ignition of controlled rectifier SCR–2 whose gate-cathode terminals are connected to secondary winding W–2 of the pulse transformer. Capacitor 19 discharges during time $t_d$ by way of inductor 18, while its voltage reverses its polarity. Since this discharge is of oscillatory nature, current $I_d$ will pass through zero at the end of time $t_d$ causing SCR–2 to become nonconductive, again. During the first time interval $t_m$ mentioned, saturable reactor SR–1 is reset on its minor B-H loop to point $a'_1$ by means of the control source voltage applied to terminals 22, since its gate winding is essentially interrupted by the then reverse biased diode D–1.

During time $t_d$, saturable reactor SR–2 remained at its positive residual point $b_1$ since no flux change could take place while SCR–2 was in its conducting state, thereby short-circuiting SR–2. At the instant where controlled rectifier SCR–2 becomes open-circuited, voltage of reverse polarity is now applied to the gate circuit of SR–2 reverse biasing diode D–2. At the same instant diode D–1 becomes conductive since now the lower plate of capacitor 19 is positive. Saturable reactor SR–1 absorbs a volt-time integral represented by the hatched area $A'_1$ when its flux changes from its reset point $a'_1$ toward negative saturation.

Reactor SR–1 then experiences a flux density change $\Delta B'_1$ until saturating at the end of the second time interval $t_m$, where $\Delta B'_1$ must be proportional in value to area $A'_1$. In steady state operation, that means at a constant control source voltage applied to terminals 22, areas $A_1$ and $A'_1$ as well as flux density changes $\Delta B_1$ and $\Delta B'_1$ must be equal in value.

At the instant of negative saturation of saturable reactor SR–1, a sudden increase of its magnetizing current $I_{m_1}$ occurs causing ignition of controlled rectifier SCR–1 and a following discharge of capacitor 19 with polarity reversal of its terminal voltage back to its original polarity. Since during the second time interval $t_m$ diode D–2 was reverse biased blocking flow of current in the gate winding of SR–2, this reactor will be reset on its minor loop to point $a_1$ in the same manner as reactor SR–1 had been reset previously. During the second time interval $t_d$ reactor SR–1 remains at its negative residual point $b'_1$. At the instant where controlled rectifier SCR–1 becomes again nonconductive, the series of described events will go on in continuous succession.

FIGURES 2*b* and 2*c* may now be studied in somewhat more detail. In FIGURE 2*b*, curve $E_2$ shows the output voltage wave shape for the condition of an approximately 30 percent larger output voltage than that of FIGURE 2*a*. The changes $\Delta B_2$ and $\Delta B'_2$ of flux density within reactors SR–2 and SR–1 are therefore also 30 percent larger as is the case for volt-time areas $A_2$ and $A'_2$. In FIGURE 2*c*, curve $E_3$ illustrates the wave shape of the output voltage for the case that this voltage is reduced by about 30 percent in comparison with that of FIGURE 2*a*. Flux density changes $\Delta B_3$ and $\Delta B'_3$ as well as volt-time areas $A_3$ and $A_3'$ are therefore also reduced by 30 percent. Concerning the sequence of events, no further explanation for these figures is considered necessary since they are the same as previously described for the case of FIGURE 2*a*. It need only be mentioned that the reset points on the corresponding minor BH-loops have been identified as numerals $a_2$, $a_2'$ and $a_3$, $a_3'$ in order to indicate that they are different from reset points $a_1$, $a_1'$ of FIGURE 2*a*.

In earlier known "Direct Current Controlled A.C. Voltage Sources" as described in the article cited above of Manteuffel and McCary as well as in conventional magnetic stabilizers such as shown in FIGURE 1, the capacitor must discharge through the saturated inductance of relatively bulky saturable reactors. The saturated inductance of such reactors has a given value for the most economical design with regard to weight, efficiency and permissible temperature rise; and, cannot be reduced below this value. This also means that the discharge time $t_d$ cannot be reduced below a fixed minimum value. Neglecting the very undesirable losses produced in such saturable reactors (which is the main reason for their large physical sizes), in general, discharge times $t_d$ in the order of 15% of time $t_m$ are inherent to those earlier devices. The circuit arrangements of the new amplifier with shunt load permit freedom of choice for the value of time $t_d$ since it is determined by the value of inductance 18 (e.g., in FIGURE 2) which can be chosen solely on the basis of maximum permissible discharge currents passing through the controlled rectifiers. Such rectifiers are capable of withstanding very large instantaneous currents at a relatively low duty cycle. In a number of practical applications of the new shunt loaded amplifier it has therefore been possible to reduce the discharge time $t_d$ to about 5% of time $t_m$. Reduction of the discharge time to a small value is of a twofold advantage for the operation of the shunt loaded amplifier.

The first advantage is based on the fact that a much better square wave shape of the output voltage is obtainable which will require less filtering in cases where the output voltage is rectified. This case occurs if the amplifier is used as the main regulationg element in a regulated direct current power supply. Combined with this advantage is the avoidance of large discharge losses as normally encountered in "Direct Current Controlled Voltage Sources" or conventional magnetic stabilizers. Reduced discharge losses result in less attenuation of the voltage during the discharge transient, which also contributes to an improved square wave shape. This attenuation has been approximately 5 percent in practically built shunt loaded amplifiers while an attenuation in the order of up to 25 percent has been observed in the voltage wave shape of those devices mentioned earlier.

In order to explain the second advantage, reference is now made to FIGURE 2*d* which illustrates three different output voltage wave forms as resulting from three different line voltages applied to terminals 16 of the shunt loaded amplifier but under the condition that the reset voltage at terminals 22 of the control circuit is held constant. A variation in line voltage of about ±20 percent around the point of nominal operation was chosen for the construction of these wave shapes.

The voltage versus time curves A, B, and C of FIGURE 2*d*, shown here only for the duration of one half-cycle, represent the cases of low, nominal, and high line voltage, respectively. Again, as in FIGURES 2*a*–2*c*, the discharge time $t_d$ is much exaggerated for purposes of a more visually apparent display of the second advantage.

The non-hatched areas $F_1$, $F_2$, and $F_3$ represent the volt-time integrals absorbed by either reactor SR–1 or SR–2 during time $t_m$. They are equal in value since the constancy of the reset voltage assures in all three cases the same amount of change in flux density $\Delta B$ as will be understood from the foregoing discussion of FIGURES 2*a*–2*c*. Instantaneous values $e_1$, $e_2$, and $e_3$ of the output voltage at the start of the discharge transient are different for the three considered cases. The hatched areas $a_1+a_2$, $b_1+b_2$, $c_1+c_2$ represent additional volt-time integrals where $c_1+c_2>b_1+b_2>a_1+a_2$ since $e_3>e_2>e_1$.

In the case of D.C.-controlled voltage sources, these areas exhibit the fluxes absorbed by the two heavy saturable reactors employed in those earlier devices during their condition of saturation. In the case of the new amplifier with shunt load, these areas represent the flux in inductor 18 of FIGURE 2.

As can be seen by inspection of FIGURE 2*d*, the hatched areas contribute to the apparent half-cyclic average value of the output voltage. Since they become larger with increasing line voltage, they will cause an increase of the output voltage. It becomes now apparent that the discussed increase in output voltage is a direct function of the discharge time $t_d$ since these areas are linearly proportional to $t_d$. Since the circuit arrangement of the shunt loaded amplifier permits the reduction of discharge time $t_d$ to its absolute minimum, it exhibits a much higher degree of output voltage stability with regard to line voltage variations under the condition of a control voltage of fixed value. This excellent stability is the same for high or low values of output voltage of the new amplifier as may be desired.

Continuing the detailed description, attention is now directed to the embodiment of the invention shown in FIGURE 3. In this embodiment the reference numeral 24' is used to identify a pair of input terminals. The upper input terminal is connected to one end of a first linear inductance 25. The opposite end of the inductance 25 is connected to join the adjacent end of a second linear inductance 26.

One plate of a capacitor 27 is connected to the juncture between inductors 25 and 26. The opposite plate of capacitor 27 is tied to the lower input terminal 24', and a load circuit 28 is connected in parallel with the plates of the capacitor.

In the right-hand portion of the firing circuit, the reference character SCR–3 is used to designate a first controlled silicon rectifier. The cathode of rectifier SCR–3 is connected to one end of the linear inductor 26. The anode of the rectifier SCR–3, on the other hand, is coupled to the plate of the capacitor 27 which is electrically common with the lower input terminal 24'.

The silicon rectifier SCR–3 includes a control electrode 29 which is used to gate the rectifier from the nonconductive to the conductive state. The anode of the rectifier SCR–3 is connected to the control electrode 29 through a circuit which includes a diode D–3 and a saturable reactor SR–3 connected in series.

Throughout the present specification, the arrow symbol used in conjunction with all diodes or rectifiers will be used to identify the anode elements of such units, and the small short line which intersects the apex of the arrow symbol will be used to identify the cathode elements of these units.

In the left-hand portion of the firing circuit shown in FIGURE 3, there is illustrated a controlled silicon rectifier SCR–4. The cathode element of rectifier SCR–4 is conductively connected to the anode element of the rectifier SCR–3.

The anode element of the rectifier SCR–4 is, conversely, tied to the cathode element of the rectifier SCR–3 to place the rectifiers in back-to-back relationship.

The silicon rectifier SCR–4 includes a control electrode 30 which is used to gate the element from the non-conductive to the conductive state. The control electrode of rectifier SCR–4 is coupled to its anode element through a diode D–4 and a saturable reactor SR–4 connected in series.

The saturable reactors SR–3 and SR–4 employed in FIGURE 3 experience saturation levels which are governed by the current flowing through a plural coil signal winding WS–2. Each of the coils provided in the signal winding is positioned to influence one of the respective cores. The unidirectional current which is required to energize the signal winding is supplied via a pair of input terminals 31 and is caused to traverse a control circuit resistor 32 connected in series with the coils in the winding.

The embodiment of the invention shown in FIGURE 3 represents a simplified modification of the circuit shown in FIGURE 2 in that the use of a pulse transformer PT–1 is eliminated with no loss in performance, or superiority over prior art magnetic systems. It will be appreciated that the operation of the circuit shown in FIGURE 3 is substantially the same as the circuit shown in FIGURE 2.

Turning to FIGURE 4 of the accompanying patent drawings, reference will now be made to an embodiment of the invention in which a symmetrical slaving circuit is used which employs only one reactor that is controlled from an external signal source. In this figure, the reference numeral 34 is used to designate a set of input terminals. The upper terminal is connected to a first linear inductor 35 which is connected in series circuit relationship with a second linear inductor 36. One plate of a capacitor 37 is connected to the juncture between the first and second linear inductors, and the opposite plate of this capacitor is tied to the lower input terminal 34.

In the right-hand portion of the firing circuit, the reference character SCR–5 is used to identify a silicon rectifier provided with a control electrode 39. The cathode of the rectifier SCR–5 is connected to one end of the linear inductor 36. The anode of the rectifier, on the other hand, is connected to the plate of capacitor 37 which is electrically common with the lower input terminal 34.

In the left-hand portion of the firing circuit, a second oppositely poled silicon rectifier SCR–6 is illustrated. The cathode element of this rectifier is conductively connected to the anode element of rectifier SCR–5. The anode element of rectifier SCR–6, conversely, is tied to the cathode element of rectifier SCR–5 to place the rectifiers in a back-to-back relationship.

The rectifier SCR–5 is provided with a control electrode 39 which is energized to gate the rectifier between the non-conductive and conductive states. This control electrode is coupled to the anode through a saturable reactor SR–5. A resistor 41 is connected in shunt between the control electrode and the cathode of this rectifier.

In the gating circuit for the rectifier SCR–6, the anode element is tied to the control electrode 40 by means of a saturable reactor SR–6 connected in series with a diode D–5. A resistor 42 is connected in shunt between the control electrode of this rectifier and its cathode element.

The flux levels for the reactors SR–5 and SR–6 are controlled by the flow of current through a signal winding WS–3. The current flow in the winding WS–3 is provided by the control potential applied across a pair of input terminals 43, and is forced to traverse a control circuit resistor 44. During a first arbitrarily chosen half-cycle, the level of the flux swing is established in saturable reactor SR–6 by the value of the control potential which is applied to the signal winding WS–3 during the non-conducting half-cycle of the control circuit when diode D–5 is essentially open. During the following half-cycle, when reactor SR–6 becomes saturated, the rectifier SCR–6 fires and reverses the charge on the capacitor 37. During this gating half-cycle, saturable reactor SR–5 is reset. The volt-time integral of the reset flux is equal to the volt-time integral of the flux swing established in saturable reactor SR–6, since this integral determines the voltage at capacitor 37. When the voltage at capacitor 37 is reversed by firing SCR–6, the gating half-cycle of SR–5 starts, and this reactor absorbs exactly the same volt-time integral with which it has just been reset, until it fires and causes rectifier SCR–5 to fire. When this occurs, capacitor 37 again reverses polarity.

The low ohmic resistor 42 in this circuit serves to bypass magnetizing current and to limit the voltage directly across the control electrode and anode of rectifier SCR–6. The resistor 41 is connected between the control electrode and anode of rectifier SCR–5 to serve the same purpose.

In the circuit of FIGURE 4, the saturable reactor SR–5 acts as a slave reactor with a flux swing determined by the amount of flux swing imposed through the control voltage applied to the input terminals 43 to influence reactor SR–6 during the resetting interval of core magnetization.

Returning to the detailed description of the various embodiments of the invention, reference to FIGURE 5 of the accompanying drawings will now be made. In this figure, an improved magnetic amplifier type of voltage-controlling device with means provided for suppressing unidirectional voltage components in the output potential is illustrated. In this magnetic amplifier the reference numeral 45 is used to designate a pair of input terminals. The upper input terminal is connected to one end of a linear inductor 46. The inductor 46 is connected in series with a second linear inductor 47. One plate of a capacitor 48 is interconnected to the juncture between inductors 46 and 47. The opposite plate is tied to the lower input terminal 45, and a load circuit 49 is connected in parallel across the plates of the capacitor.

In the central portion of the firing circuit, the reference character T–2 has been used to identify a transformer provided with a primary winding and a pair of secondary windings W–3 and W–4. The primary winding of transformer T–2 is connected between one end of inductance 47 and the plate of capacitor 48 which is electrically common with the lower input terminals 45.

To the right of the transformer T–2, there is shown a controlled silicon rectifier SCR–7 which is provided with a control electrode 50. The electrode 50 is tied to the cathode element of the rectifier by way of the secondary winding W–3 of transformer T–2 and a saturable reactor SR–7 connected in series. A resistor 51 is connected in parallel with the reactor SR–7 and the secondary winding W–3.

In the left-hand portion of the firing circuit shown in FIGURE 5, a controlled silicon rectifier SCR–8 is provided. The rectifier SCR–8 includes a control electrode 52 which is tied to the cathode element thereof by way of a diode D–6, secondary winding W–4, and a saturable reactor SR–8 connected in series. A resistor 53 is connected in parallel with the latter mentioned three elements. The cathode of rectifier SCR–8 is conductively tied to the anode of the rectifier SCR–7. The anode of rectifier SCR–8, on the other hand, is connected directly to the cathode of rectifier SCR–7, in order to place the rectifiers in back-to-back relationship.

The flux level within the saturable reactor SR–8 is controlled by the flow of unidirectional current through a signal winding WS–4. The current is supplied from a suitable source of control potential applied to input terminals 54 and traverses a control circuit resistance 55 connected in series with the signal winding.

The circuit shown in FIGURE 5 offers very significant advantages. For instance, in certain types of magnetic amplifiers, a very minute D.-C. voltage may appear across the terminals of the capacitor. This small unidirectional voltage is of the order of one-tenth to two-tenths of one percent of the A.-C. output voltage. Often, this current exerts no deleterious effects on the subsequent stages of the circuit and may be tolerated with no loss in efficiency or performance.

The small unidirectional component is of no effect where an ohmic load circuit is directly connected to the output terminals. However, if the load circuit is coupled across the capacitor through the impedance of a transformer, some unidirectional saturation of the transformer may occur, because of the low resistance of the primary winding of such a transformer.

The occurrence of such small D.-C. components may be readily explained by referring briefly to FIGURE 4. During the resetting half-cycles for the slave reactor SR–5, while control reactor SR–6 is driven to saturation, reactor SR–5 absorbs a volt-time integral determined by the flux change in reactor SR–6, and by the ohmic voltage drops across the winding, the diode D–5 and the control electrode of the rectifier SCR–6. During the following flux setting half-cycle of reactor SR–5, the total flux change within the slave reactor until saturation is reached equals that absorbed during the previous half-cycle. Additionally, a minute unidirectional voltage is present across the cathode and anode of control rectifier SCR–5 just before this rectifier fires, because the control electrode-to-cathode junction forms a rectifying element in series with the winding of the reactor SR–5. The average value of this minute unidirectional potential is determined by the current necessary to fire rectifier SCR–5 multiplied by the sum of the winding resistance and the control electrode resistance. This potential appears across the output terminals and is supplied from the plates of the capacitor 37.

FIGURE 5 illustrates a circuit arrangement which entirely circumvents the possibility of any D.-C. potential appearing at the output terminals of the shunt loaded magnetic amplifier.

In this circuit, the primary winding of transformer T–2 is connected across the cathode-anode elements of the controlled rectifiers SCR–7 and SCR–8, as previously mentioned. The secondary winding W–4 energizes the gate or operating winding of reactor SR–8. A resistor 53 is connected as shown to the control electrode of silicon rectifier SCR–8. Secondary winding W–3 serves to energize the reactor SR–7. The resistor 51 is connected between control electrode and cathode of SCR–7. The resistors 51 and 53 serve to limit the voltage applied to the control electrodes, in order to prevent firing of the controlled silicon rectifiers by the magnetizing current drawn by reactors SR–7 and SR–8.

In the embodiment of the invention shown in FIGURE 5, both saturable reactors are coupled to the control electrode circuits by means of the transformer T–2. As a result, the minute unidirectional voltage referred to above as needed to fire one of the rectifiers, is no longer required to be supplied by the capacitor in the circuit.

In many applications, where the amplitude of the required load voltage is higher than the value of the available input voltage, it is necessary to use an output transformer. The embodiment of the invention for providing this mode of operation is illustrated in FIGURE 6. In this figure the windings of the type identified by the reference numerals W–3 and W–4 in FIGURE 5 may be wound directly on the core of the output transformer.

The reference numeral 56 has been used in this embodiment to identify a pair of input terminals. The upper input terminal is connected to one end of the linear inductance 57. A transformer 58 provided with a tapped primary winding is illustrated in the right-hand portion of the drawings. The transformer 58 includes, in addition to the tapped primary winding, a pair of tertiary windings identified by the reference characters W–5 and W–6. The tap junction on the primary winding of transformer 58 is connected directly to one end of the linear inductor 57, and the opposite ends of the primary winding are connected directly across the plates of a capacitor 59. The load circuit 60 in FIGURE 6 is connected directly across the opposite ends of the secondary winding of the transformer 58.

In the center portion of the firing circuit, there is shown a linear inductor 61. The inductor 61 is connected in series with a controlled silicon rectifier SCR–9 across the opposite ends of the primary winding of the transformer. The cathode element of rectifier SCR–10 is conductively tied to the anode element of rectifier SCR–9. The cathode element of rectifier SCR–9, conversely, is connected directly to the anode element of rectifier SCR–10 to place the rectifiers in back-to-back relationship.

The rectifiers SCR–9 and SCR–10 are provided with individual control electrodes 62 and 63 respectively. The control electrode 62 associated with rectifier SCR–9 is coupled to the cathode electrode through a saturable reactor SR–9 and tertiary winding W–6 connected in series, and a resistor 64 is connected in parallel with the latter-mentioned pair of elements.

The control electrode 63 associated with control silicon rectifier SCR–10 is coupled to the cathode through a diode D–7, tertiary winding W–5 and a reactor SR–10 connected in series, and a resistor 65 is connected in parallel with the latter-mentioned three elements.

In FIGURE 6 the reactor SR–10 experiences a saturation level which is controlled by the value of the current flowing through a signal winding WS–5. The control potential is applied to this winding across a pair of terminals 66, and the resulting current is caused to traverse a control circuit resistor 67. The circuit of FIGURE 6 functions in substantially the same manner as explained in connection with the detailed description of FIGURE 5, and illustrates how the voltage produced across the capacitor may be raised to a higher level than the source voltage consistent with the use of a relatively lightweight capacitor, and elimination of D.-C. components in the output potential.

In concluding the detailed description of the invention, reference to FIGURE 7 of the drawings will now be made to illustrate the use of a synchronous rectifier. The synchronous rectifier, or transistor used in FIGURE 7 is used to block current flow in the gate circuit of one of the reactors during the half-cycle required for flux resetting. In the embodiments of the invention illustrated in FIGURE 5 and FIGURE 6, step-down transformation of the voltage at the capacitor is used to gate the control electrode circuits of both controlled silicon rectifiers. If a step signal is applied to the signal windings of either saturable reactor SR–8 or SR–10 in these figures in the proper sense to increase the output voltage of the amplifier, the induced voltage across the operating coil of the reactor during the resetting half-cycle may exceed the voltage available for blocking diodes D–6 or D–7, respectively. If either such diode should become temporarily conductive in the forward direction, a loading effect on the control circuit may be occasioned. This means that a larger control current is required for resetting than would be the case when the diode blocks properly during this condition. As a result, resetting may not be achieved precisely within a one half-cycle time interval. A circuit for insuring resetting within a one half-cycle interval is illustrated in FIGURE 7. With this circuit the application of a step function to the control winding of the reactors may be used without lengthening the time required for resetting.

In FIGURE 7, it may be noted preliminarily that the diode corresponding to D–6 or D–7 in FIGURES 5 and 6, respectively, is replaced by a synchronous rectifier, or transistor Q. The synchronous rectifier Q is controlled from the secondary winding of a small transformer. With the use of the rectifier Q, current flow in the winding which gates the control electrode of rectifier SCR–12 is blocked during the resetting half-cycle. Unrestricted resetting of the flux to a higher level is allowed when a step type signal is applied to the control windings for the reactor.

Turning to a more detailed description of FIGURE 7, it will be noted that the reference numeral 67 is used to designate a pair of input terminals. The upper terminal is connected to one end of a linear inductance 68, the opposite end of which is tied to one plate of a capacitor 69. The other plate of capacitor 69 is connected to the lower input terminal 67, and a load circuit 70 is connected in parallel across the plates of the capacitor. A linear inductor 71 is connected at one end to the juncture between inductance 68 and capacitor 69, and a resistance 72 is connected in parallel with the inductance 71. This resistor 72 is used to dissipate stored energy in inductor 71 at the instances when current flow through either controlled rectifier SCR–11 or SCR–12 is interrupted in order to protect these rectifiers from high voltage peaks which would otherwise occur at inductor 71 at the instant of current interruption. It will be appreciated that the use of the over-voltage limiting resistor 72 may be employed in conjunction with the embodiments of FIGURES 2 to 6.

In the center of the firing circuit, there is shown a transformer T–3 which includes a first secondary winding W–7 and a tapped secondary winding divided into winding portions W–8 and W–9. The primary winding of transformer T–3 is connected between one end of inductor 71 and the plate of capacitor 69 which is electrically common with the lower input terminal 67.

To the right of transformer T–3 there is connected a controlled silicon rectifier SCR–11 which is provided with a control electrode 73.

To the left of the transformer T–3 an oppositely poled controlled silicon rectifier SCR–12 is shown. The rectifier SCR–12 includes a control electrode 74. The cathode element of rectifier SCR–12 is connected directly to the anode element of rectifier SCR–11. The cathode element of SCR–11 is tied directly to the anode element of rectifier SCR–12 to place the rectifiers in back-to-back connection.

The control electrode 73 associated with rectifier SCR–11 is connected to the cathode through secondary winding W–7 and saturable reactor SR–11. A resistor 75 is connected in shunt across the latter-mentioned two elements. The control electrode 74 associated with rectifier SCR–12 is connected to the emitter electrode of a transistor or synchronous rectifier Q. The base and collector electrodes of the transistor Q are joined by the secondary winding portion W–9 of transformer T–3.

The secondary winding portion W–8 joins portion W–9 at one end and is connected at the other end through saturable reactor SR–12 to the cathode element of controlled silicon rectifier SCR–12. A resistor 76 is interconnected between the emitter electrode of the synchronous rectifier Q and the cathode element of the controlled silicon rectifier.

The level of saturation in the reactor SR–12 is controlled by current which flows through a control winding WS–6. This current is caused to flow by the application of control potential to a pair of input terminals 77, and is caused to traverse a control circuit resistor 78.

As mentioned earlier in the present specification, the synchronous rectifier acts to block current flow in the winding which gates rectifier SCR–12 during the resetting half-cycle, and allows unrestricted resetting of the flux to a higher level when a step type waveform is applied to the control circuit WS–6. It will be recognized by those skilled in the art that synchronous rectifiers may be employed to replace the diodes illustrated in FIGURES 2 through 6 as well as is illustrated in the circuit of FIGURE 7.

While the embodiments illustrated in FIGURES 5, 6 and 7 include the slave reactor principle of FIGURE 4, it will be apparent to those skilled in the art that the control method of FIGURE 3 may be employed with the circuit arrangements of FIGURES 5 to 7 simply by controlling both reactors by means of control windings and inserting a diode or synchronous rectifier, respectively, into the gate circuit of the slave reactor.

In conclusion, it will be evident that I have disclosed operative embodiments of my invention in full, clear and concise terms as required by the patent statute. However, it will be equally evident that many modifications, substitutions and alterations may be effected therein without departing in any manner from the spirit and scope of the appended claims.

What is claimed is:

1. In a shunt load magnetic amplifier circuit having access to a source of alternating supply voltage, a pair of input terminals, a first linear inductor having one end connected to one of said input terminals, a capacitor serially coupled between the opposite end of said first linear inductor and the other of said input terminals in order to supply operating voltage to a load circuit coupled across the plates of said capacitor, a second linear inductor having one end connected to the juncture between said capacitor and said first linear inductor; pulse transformer means, means including a pair of oppositely poled controlled silicon rectifiers, each provided with individual control electrodes, said rectifiers connected in parallel between the opposite end of said second linear inductor and a plate of said capacitor electrically common with said other input terminal; and means including a saturable reactor and a diode connected in series with said pulse transformer means and in parallel with each of said rectifiers to apply gating potentials to each of said control electrodes thereof.

2. In a shunt load magnetic amplifier circuit having access to a source of alternating supply voltage, a pair of input terminals, a first linear inductor having one end connected to one of said input terminals; a capacitor serially coupled between the opposite end of said linear inductor and the other of said input terminals in order to supply operating voltage to a load circuit coupled across the plates of said capacitor, a second linear inductor having one end connected to the juncture between said capacitor and said first linear inductor, pulse transformer means, means including first and second oppositely poled controlled silicon rectifiers each provided wtih individual control electrodes, means connecting said rectifiers in parallel between the opposite end of said second linear inductor and a plate of said capacitor electrically common with said other input terminal, and circuit means including the primary winding of said pulse transformer connected in series with a pair of saturable reactors and a pair of oppositely poled diodes to control the application of gating potentials to each of said control electrodes of said rectifiers.

3. In a shunt load magnetic amplifier circuit having access to a source of alternating supply voltage, a pair of input terminals, a first linear inductor having one end connected to one of said input terminals, a capacitor serially coupled between the opposite end of said linear inductor and the other of said input terminals in order to supply operating voltage to a load circuit coupled across the plates of said capacitor, a second linear inductor having one end connected to the juncture between said capacitor and said first linear inductor; first and second oppositely poled controlled silicon rectifiers each provided with individual control electrodes, and connected in parallel between the opposite end of said second linear inductor and the plate of said capacitor electrically common with said other input terminal; and means including a diode and a saturable reactor connected to each of said control electrodes of said rectifiers to apply gating potentials thereto.

4. In a shunt load magnetic amplifier circuit having access to a source of alternating supply voltage, a pair of input terminals, a first linear inductor having one end connected to one of said input terminals, a capacitor serially coupled between the opposite end of said linear inductor and the other of said input terminals in order to supply operating voltage to a load circuit coupled across the plates of said capacitor, a second linear inductor having one end connected to the juncture between said capacitor and said first linear inductor; a pair of oppositely poled controlled silicon rectifiers each provided with individual control electrodes and connected in parallel between the opposite end of said second linear inductor and the plate of said capacitor electrically common with said other input terminal, means including a series connected diode and a first saturable reactor connected to said control electrode of said first rectifier, means including a saturable reactor connected to said control electrode of said second rectifier, and means including a signal winding connected to receive a unidirectional current to control the flux level in said first saturable reactor.

5. In a shunt load magnetic amplifier circuit having access to a source of sinusoidal supply voltage, a pair of input terminals, a first linear inductor having one end connected to said of said input terminals, a capacitor serially coupled between the opposite end of said linear inductor and the other of said input terminals in order to supply operating voltage to a load circuit coupled across the plates of said capacitor, a second linear inductor having one end connected to the juncture between said capacitor and said first linear inductor; means including first and second oppositely poled silicon rectifiers, each provided with individual control electrodes and connected in parallel between the opposite end of said second linear inductor and the plate of said capacitor electrically common with said other input terminal; means including saturable reactor means and diode means connected in circuit with each control electrode of each of said rectifiers, and means including a signal winding disposed to carry control current to regulate the flux level in at least one of said reactor means.

6. In a shunt load magnetic amplifier circuit having access to a source of alternating supply voltage, a pair of input terminals, a first linear inductor having one end connected to one of said input terminals, a capacitor serially coupled between the opposite end of said linear inductor and the other of said input terminals in order to supply operating voltage to a load circuit coupled across the plates of said capacitor, a second linear inductor having one end connected to the juncture between said capacitor and said first linear inductor; first and second oppositely poled silicon rectifiers, each provided with individual control electrodes and connected in parallel between the opposite end of said second linear inductor and the plate of said capacitor electrically common with said other input terminal; a transformer provided with secondary windings and a primary winding connected in parallel with said rectifiers; means including diode means, a saturable reactor, and one of said secondary windings connected in series to gate said control electrode of said first rectifier; means including a saturable reactor and another of said secondary windings connected to gate said control electrode of said second rectifier, and means including a signal winding disposed to carry control current to regulate the flux level in said first-mentioned saturable reactor.

7. In a shunt load magnetic amplifier circuit having access to a source of alternating supply voltage, a pair of input terminals, a first linear inductance having one end connected to one of said input terminals; a first transformer provided with a tapped primary winding, a pair of tertiary windings, and a secondary winding adapted to feed a load circuit; a capacitor serially interconnected between opposite ends of said tapped primary winding, one plate of said capacitor being connected to the other input terminal, a second linear inductor coupled in series with a first controlled silicon rectifier and connected in parallel with said capacitor; a second silicon rectifier coupled in shunt with said first rectifier and oppositely poled with respect thereto, each of said silicon rectifiers including a control electrode; means including a saturable reactor connected in series with one of said tertiary windings of said transformer to gate one of said control electrodes, and means including a diode and a saturable reactor connected in series with the other of said tertiary windings to gate said control electrode of said other rectifier.

8. In a shunt load magnetic amplifier circuit having access to a source of alternating supply voltage, a pair of input terminals, a first linear inductor having one end connected to one of said input terminals, a capacitor serially coupled between the opposite end of said linear inductor and the other of said input terminals in order to supply operating voltage to a load circuit coupled across the plates of said capacitor, a second linear inductor having one end connected to the juncture between said capacitor and said first linear inductor; first and second oppositely poled controlled silicon rectifiers, each provided with individual control electrodes and connected in parallel with said rectifiers between the opposite end of said second linear inductor and the plate of said capacitor electrically common with said other input terminal; transformer means having a primary winding connected in parallel with said rectifiers and provided with a pair of secondary windings, means including one of said secondary windings and a saturable reactor connected to gate one of said control electrodes; and means including a transistor, a saturable reactor and the other of said secondary windings connected to gate the other of said control electrodes.

9. In a shunt load magnetic amplifier circuit having access to a source of alternating supply voltage, a pair of input terminals, a first linear inductor having one end connected to one of said input terminals, a capacitor serially coupled between the opposite end of said linear inductor and the other of said input terminals in order to supply operating voltage to a load circuit coupled across the plates of said capacitor, a second linear inductor having one end connected to the juncture between said capacitor and said first linear inductor, means including first and second oppositely poled controlled silicon rectifiers provided with individual control electrodes and connected in parallel with said rectifiers between the opposite end of said second linear inductor and the plate of said capacitor electrically common with said other input terminal, means including saturable reactor means connected to gate one of said control electrodes, and means including a synchronous rectifier connected to gate the other of said rectifiers.

10. In a shunt loaded magnetic amplifier circuit having access to a source of alternating voltage, a series circuit comprising first inductive means and a capacitor connected to draw current from said source, load means connected across the plates of said capacitor, a pair of oppositely poled controlled rectifiers in parallel arrangement connected in series with second inductive means, said series parallel circuit connected in shunt with said capacitor and said load means, and means including at least two saturable reactors to gate said rectifiers from the nonconductive to the conductive state alternately at half cycles of the supply frequency.

11. In a shunt loaded magnetic amplifier circuit having access to a source of alternating voltage, a series circuit comprising first inductive means and a capacitor connected to draw current from said source, load means connected across the plates of said capacitor, a pair of oppositely poled controlled rectifiers in parallel arrangement connected in series with second inductive means, said series parallel circuit connected in shunt with said capacitor and said load means, means including at least two saturable reactors to gate said rectifiers from the nonconductive to the conductive state alternately at half cycles of the supply frequency, at least one of said saturable reactors being connected in circuit with the control electrode of each of said controlled rectifiers, and a diode in series with at least one of said saturable reactors.

12. In a shunt loaded magnetic amplifier circuit having access to a source of alternating voltage, a series circuit comprising first inductive means and a capacitor connected to draw current from said source, load means connected across the plates of said capacitor, a pair of oppositely poled controlled rectifiers in parallel arrangement connected in series with second inductive means, said series parallel circuit connected in shunt with said capacitor and said load means, means including at least two saturable reactors to gate said rectifiers from the non-conductive to the conductive state alternately at half cycles of the supply frequency, and said gating means including means to cause control current flow through at least one of said saturable reactors to regulate the flux level therein.

References Cited in the file of this patent

UNITED STATES PATENTS

| | | |
|---|---|---|
| 2,409,151 | Rogers | Oct. 8, 1946 |
| 2,920,240 | Macklem | Jan. 5, 1960 |
| 2,929,013 | McNamee | Mar. 15, 1960 |